(12) United States Patent
Profe et al.

(10) Patent No.: US 12,523,522 B2
(45) Date of Patent: Jan. 13, 2026

(54) SIGNAL PROCESSING METHOD FOR MULTIHEAD SCALES

(71) Applicant: MULTIPOND Wägetechnik GmbH, Waldkraiburg (DE)

(72) Inventors: Felix Profe, Winhöring (DE); Wolfram C. Zeck, Mühldorf (DE)

(73) Assignee: MULTIPOND Wägetechnik GmbH, Waldkraiburg (DE)

( * ) Notice: Subject to any disclaimer, the term of this patent is extended or adjusted under 35 U.S.C. 154(b) by 1177 days.

(21) Appl. No.: 17/189,307

(22) Filed: Mar. 2, 2021

(65) Prior Publication Data
US 2021/0396571 A1    Dec. 23, 2021

(30) Foreign Application Priority Data
Jun. 19, 2020   (EP) .................................. 20181181

(51) Int. Cl.
| | |
|---|---|
| *G01G 23/42* | (2006.01) |
| *G01G 13/00* | (2006.01) |
| *G01G 19/40* | (2006.01) |
| *G01G 23/37* | (2006.01) |
| *G06N 3/08* | (2023.01) |

(52) U.S. Cl.
CPC .............. *G01G 23/42* (2013.01); *G01G 13/00* (2013.01); *G01G 19/40* (2013.01); *G01G 23/37* (2013.01); *G06N 3/08* (2013.01)

(58) Field of Classification Search
CPC ........ G01G 23/42; G01G 13/00; G01G 19/40; G01G 23/37; G06N 3/08
IPC .......... G01G 23/42,13/00, 19/40, 23/37; G06N 3/08
See application file for complete search history.

(56) References Cited

U.S. PATENT DOCUMENTS

| | | | | |
|---|---|---|---|---|
| 4,534,428 A | * | 8/1985 | Mosher ................ | G01G 19/393 177/1 |
| 5,167,006 A | * | 11/1992 | Furuta .................... | G06N 3/063 706/41 |
| 6,013,879 A | * | 1/2000 | Nakamura ............. | G01G 23/10 177/199 |
| 6,260,003 B1 | * | 7/2001 | Bagley ............... | G01G 23/3707 177/25.14 |
| 2007/0271056 A1 | | 11/2007 | Nussbaumer et al. | |
| 2012/0262610 A1 | * | 10/2012 | Rissa ..................... | H04N 23/84 348/E9.003 |

(Continued)

FOREIGN PATENT DOCUMENTS

| | | | | |
|---|---|---|---|---|
| CN | 1844865 | * | 10/2006 | ............. G01G 19/03 |
| EP | 1860410 | | 11/2007 | |

(Continued)

*Primary Examiner* — Lisa M Caputo
*Assistant Examiner* — Sharah Zaab

(57) ABSTRACT

The present invention relates to a signal processing method for weight signals (W) of scales, in particular combination scales (K).

Signal processing is performed using preprocessed discrete values (W(i)) of the weight signal (W), which are supplied to at least one artificial neural network. With the help of this at least one artificial neural network, an estimated value (SW) for the actual weight is determined, for example in a weighing device of a combination scale. This is performed faster than if waiting for the actual weight signal. The estimated values (SW) are forwarded to the combination scale (KW), which uses them to form combinations.

13 Claims, 10 Drawing Sheets

(56) References Cited

U.S. PATENT DOCUMENTS

2013/0124142 A1\* 5/2013 Zeck ..................... G06F 17/00
 702/191
2017/0236056 A1\* 8/2017 Shan ..................... G06N 3/08
 706/25

FOREIGN PATENT DOCUMENTS

| EP | 2522964 | | 7/2017 | |
|----|---------|---|--------|---|
| EP | 3187840 | | 7/2017 | |
| JP | H04278425 | \* | 10/1992 | ........... G01G 23/365 |
| JP | H11316153 | \* | 11/1999 | ............. G01G 23/01 |
| JP | 6656687 | | 2/2020 | |

\* cited by examiner

Calculation of an estimated value SW With at elast one artificial neural network (KNN)

Smoothening of a weight signal (W) with a digital filter (DF)

SIGNAL PROCESSING METHOD FOR MULTIHEAD SCALES

RELATED APPLICATION

This application claims the benefit of priority of European Patent Application No. 20181181.7 filed on Jun. 19, 2020, the contents of which are incorporated herein by reference in their entirety.

FIELD AND BACKGROUND OF THE INVENTION

The present invention is concerned with a signal processing method for multihead scales and a device for signal processing, wherein an estimation for the second constant value is to be made during a transition from a first constant value (weight signal when the weighing hopper of a multihead scale is empty) to a second constant value (weight signal when the weighing hopper of a multihead scale or combination scale is filled).

When product is dropped into a weighing device (which is the normal case in particular for combination scales in operation), an impact pulse is generated each time.

Theoretically, the weight signal of the weighing system increases from zero (as the first constant value) to a certain final value (weight of the dropped product as the second constant value). However, the impact pulse causes oscillations and a constant measured value can therefore not be obtained immediately—rather, an "overshooting" of the weight signal is observed first.

Therefore, the value of the weight signal fluctuates, which can be attributed in particular to the physical behavior of a weighing device. Fluctuations can be caused by a non-constant measurand, i.e. a transition of the measurand between two constant levels, as well as a superimposed noise of the measuring arrangement.

Furthermore, disturbance variables superimposed on the measured value can also occur, for example, an impact on the measured variables with periodic disturbance variables, oscillations, beatings (such as drafts) or non-system variables. For example, drafts, wind, fluctuations in humidity and vibrations of the entire weighing system can play a role in a weighing device of a multihead scale. It is also possible for a measured variable to be subjected to aperiodic disturbance variables, for example, effects of acceleration, pulses and electrostatic charges; in addition, other environmental influences can act, such as wind, solar radiation or the like.

Also, products may pile up in the weighing hopper of a weighing device, and due to instability of the products within the weighing device, the positions of the products in the weighing device may still change—for example, if five spinach cubes are dropped and all pile up in the left corner of the weighing device, they may become constantly distributed on the bottom of the weighing device due to the "tower" falling over, creating an additional impulse, which may significantly interfere with the measurement of the actual weight.

The presence of such disturbance variables leads to an inaccurate measurement, but especially to a longer measuring time until a certain accuracy of the weight is reached.

Particularly in the case of combination scales, where combinations of several weighing devices must be found continuously, it must be quickly clear which product weight is present in the individual weighing devices, which is why the measuring time here must be as short as possible—otherwise the throughput and combination capability of a multihead scale are considerably slowed down. After a quantity of product has been discharged into a weighing device, the product weight changes from a first constant value (in this case zero) to an actual product weight (i.e. a second constant value).

However, a reliable estimated value must be available for this after only a short time, since it would take too long to determine the completely exact product weight for each weighing device at ultimately static equilibrium in a combination scale.

SUMMARY OF THE INVENTION

In the prior art, filters are known which are intended to eliminate or reduce the influence of disturbance variables in measuring systems. Here, for example, analog filters can be used for the measured variable itself or a physical variable into which the measured variable has been converted (for example, an electrical signal).

Digital filters are also known, which process a digitalized measurement signal accordingly. However, when using filters, the original measurement signal is changed in a certain way—and in doing so, filters may only slightly distort the actual measurement variable in the measurement range. Disturbance variables must be strongly suppressed, and the behavior of the measurement signal in all expected situations (including environmental influences) must be stable.

Furthermore, it must be possible to obtain measurement results with a certain, specified accuracy, and measurements must be performed sufficiently quickly.

As being usual in the general state of the art, the suppression of disturbance variables in the measurement of dynamic signals is performed by applying so-called low-pass filters. Such low-pass filters allow the low-frequency components of the measurement signals to pass, while all higher-frequency components are attenuated or damped accordingly. The use of such a low-pass filter leads to a measurement signal that is free of interference or filtered, which enables a measurement result with sufficient accuracy or allows the determination of a measurement result free of interference at all. However, low-pass filters have the disadvantage that a very low reaction speed is available when the measurement signal changes, and therefore very long settling times are required until a measurement signal with sufficient accuracy is achieved. Dynamic measurements of different measured variables, which frequently fluctuate between different values, lead to a significant delay of the measurement result with a low-pass filter. The filtered measurement signal therefore falls far behind the actual measured signal.

In the state of the art, in particular document EP 2 522 964 B1 describes a special arrangement of digital filters, where the signal is first cleaned of the high-frequency components with a weak low-pass filter, and after reaching a certain fluctuation range is smoothed with a further, strong low-pass filter. In this way, an approximate measurement result can be obtained with a shortened measurement duration.

This document discloses a signal processing method for determining a measured value in measurement signals by applying a first digital filter and a second digital filter, wherein a filter changeover to an adaptive third filter is initiated after the first standstill criterion is reached, and then a final measured value is output after a second standstill criterion is reached. This adaptive filter changes over from the pre-filter to the strong filter after a first standstill criterion has been reached in order to achieve greater stability with respect to the transient process that has not yet decayed.

Furthermore, it is generally known in the state of the art that an average value is formed from several successive measured values to suppress disturbance variables. In this way, fluctuations in the individual values can no longer have a direct effect on the measurement result, which makes the filter signal quieter. Since a running average is formed here over a number of measurements, this method can be applied to continuous measurement data, and as a result all disturbance variables are attenuated and certain periodic disturbance variables can even be suppressed completely. The prerequisite for this is a sufficiently high measurement frequency.

Another method of suppressing interference is the use of digital filters. These can still be recursive with feedback, or non-recursive without feedback. Another classification distinguishes between filters with Finite Impulse Response (FIR) and filters with Infinite Impulse Response (IIR).

In digital filters, Butterworth, Bessel, Chebyshev or Cauer filters are still used very frequently.

The filters in the prior art have advantages under given application conditions. However, depending on the application, the speed of response or tolerance to disturbances of varying magnitude may not be sufficient, and under such boundary conditions, such an arrangement may not sufficiently shorten the measurement period.

It is therefore an object of the present invention to modify the signal processing of measured values during the transition of the measured value from a first constant value to a second constant value in such a way that a rapid response to any changes in the input signal can be made, the time until a sufficiently trustworthy measurement result is available can be shortened, and the stability of the measurement result after the initial acquisition can be increased.

Furthermore, it should be possible to specify various methods for stability assessment, and it should be possible to obtain sufficiently accurate measurement results even in the presence of major disturbances.

This object is solved by a signal processing method according to claim 1.

A first embodiment of the signal processing method according to the invention comprises the following steps:
  a) repeatedly sampling a measurement signal between a first constant value (i.e., the actual weight signal of an empty weighing device) and a second constant value (i.e., the actual weight signal of a full weighing device) within a predetermined period of time at a data rate, wherein i discrete values are obtained;
  b) Preprocessing of the measurement signal, determination and output of resulting parameters,
  c) Providing at least two, at most p resulting characteristics to respective inputs of at least one artificial neural network as input values, processing the input values in at least one hidden layer,
  d) Outputting q output values from an output layer, where one output value is the estimate for the second constant value, wherein the input layer, the at least one hidden layer and the output layer may have a different number of neurons which are connected via weighted connections to the neurons of the respective upstream and/or downstream layers.

The term weighing device includes the weighing hopper itself and a suitable device that reproduces its weight and thus determines the weight signal of the container.

In this case, an estimate for the second constant value of the weight signal can provide a sufficiently accurate and stable value earlier than with methods known in the prior art thus, a sufficiently accurate estimate for a weight signal of a weighing device can be determined earlier in a multihead scale—and thus, the weighing device can be used earlier for a combination formation, and the weighed product can be discharged earlier, making the weighing device available earlier for a new feed. This enables a higher product throughput of the multihead scale.

Furthermore, a faster settling of the estimated value can be realized under normal conditions, i.e. without special disturbing effects.

Furthermore, the process has higher immunity to aperiodic and periodic disturbances compared to the prior art.

Furthermore, a measurement of a weight signal under difficult conditions, a suppression of interference frequencies, and an adaptive correction function for dynamic measurement are possible.

Preferably, the resulting characteristics in step b) are selected from maxima and minima of the weight signal and the associated time points, the areas covered by the signal course at specific time points, gradients or curvatures at specific time points, as well as temperature, pressure, humidity, time, solar radiation, EMC characteristics as well as characteristics of product properties such as density, adhesive properties and degree of moisture.

Preprocessed values can better reflect characteristic features of the signal for further processing than the raw measured values.

Further preferably, in step d), the prediction accuracy is output as another output value from the artificial neural network.

The expected confidence into the accuracy of estimated values is indicated by the prediction accuracy and shall be included in the decision to use the corresponding estimated value. Thus, a standstill criterion can be adjusted depending on the prediction accuracy and lead to a value acquisition time corresponding to the possible error. In this case, a stability criterion defines the point in time at which the estimated value may be considered a valid weight value (i.e., has approached the real value closely enough), and the contents of a weighing device can be used for combination determinations of the multihead scale. The higher the requirements for the stability criterion are (i.e., the more accurate the estimated value must be and thus the closer the estimated value must be to the actual weight value of the weighing equipment), the longer the weight signal must be observed and the longer discrete values of the weight signal must be used to calculate the estimated value (i.e., the more discrete values must be calculated for the calculation).

Preferably, the signal processing method further comprises steps d1) and d2):
  d1) Checking whether the prediction accuracy is within a predetermined range of values and a standstill criterion (SSK) has been reached;
  d2) If the prediction accuracy is within a predetermined value range, accepting the estimated value as the second constant value for the weight signal; if the prediction accuracy is not within the predetermined value range, processing further weight values until a valid value is reached or adjust the stability criterion (SSK) and repeating steps a) to d1).

This prediction accuracy is used in the decision whether to use the estimated value.

The prediction accuracy can be defined differently:
  a) As the probability that the estimate is correct (prediction accuracy $PG \in (0,1)$) where, if the estimate is accurate, the prediction accuracy takes the value of one;

b) As the probable error of the estimate by subtracting the second constant value WK2 from the estimated value SW (dSW=SW−actually recorded value). In this case, the prediction accuracy is signed (PG∈(−1,1)), where the sign indicates the direction of deviation and the value is assumed to be zero for accurate estimation (PG=0); here, for example, various functions f can be used, which map the error into the range of values [−1; 1] such as sigmoid, tanh, relu . . . PG=f(dSW)

This allows the estimated value to represent a sufficiently accurate and stable value earlier than the state of the art methods. The expected confidence into the accuracy of the estimated value is indicated by the prediction accuracy PG and should be included in the decision to use the estimated value. Thus, the stability criterion SSK (i.e. the criterion that must be fulfilled when an estimated value SW is accepted and the SW is released for further use—without waiting for the actual weight value), can be adjusted depending on the prediction accuracy PG and lead to a value acquisition time WEZ corresponding to the possible error.

Which is the optimal time at which the artificial neural network is calculated can depend on various factors, such as product properties. In other words, it may depend on product properties, for example, how many preprocessed weight signals have to be used until an estimated value can be calculated with the help of the artificial neural network. For this purpose, the artificial neural network is trained and subsequently, with new measurements in progress, provides an estimated value for the weight signal and a prediction accuracy at the corresponding points in time.

It would also be possible that different artificial neural networks (with different neurons as well as weighted connections) are available for selection and, depending on the value or course of the inputs, the artificial neural network itself decides which one to use.

In a second embodiment, i artificial neural networks are used in sequence, where i is greater than 1. Then the method comprises the following further steps:

e) Reading in p resulting characteristics and q output values of the respective previous artificial neural network as new input values into another artificial neural network, wherein one output value is the estimate for the second constant value and another output value is the prediction accuracy of the respective previous artificial neural network, f) Calculating output values of the current artificial neural network, wherein one output value is the estimate for the second constant value and another output value is the prediction accuracy of the current artificial neural network;

g) Repeating steps e) and f) until i artificial neural networks have been computed;

h) Outputting of the final output values, wherein at least one final estimated value as well as a final prediction accuracy are output.

In this case, the later artificial neural networks also use, among others, the outputs of the preceding artificial neural network, optionally other preceding artificial neural networks, etc. The expected confidence into the accuracy of the prediction accuracy can be better trained herein, using the estimate of the previous stage and better reflect the quality of the prediction.

Further preferably, the decision to use the estimate as the final weight signal is made as a function of the tendency (convergence, divergence, scatter band . . . ) of the successive estimates output by the individual neural networks, or as a function of the prediction accuracies of the individual neural networks, or a combination of both.

This allows a final weight signal to be reached quickly.

In a third embodiment, output values, as estimated values of at least one artificial neural network are supplied to a digital filter, into which the current weight signal is fed as input and which tracks the temporal occurrence of the weight signal. Even if the estimated values are slightly wrong at the beginning, the digital filter will correct them with the real input values to the correct value.

This combination ensures that a good estimated value can be achieved at an early stage. The digital filter is supplied with real values, but in this embodiment it is also supplied with an estimated value at a very early stage.

In a fourth embodiment of the signal processing, one of the previously mentioned methods is used, but the course of the signal is examined for the included frequencies, e.g. by means of Fourier analysis. Thereby the periods of the low frequency signal components (e.g. f1, f2) are calculated and an average value over a whole period of the lowest is calculated. Thereby, the influence of this frequency f1 with constant amplitude is completely eliminated. If the influence of the first two low frequencies is to be eliminated, it must be averaged over a time corresponding to the smallest common multiple of the first two periods. In this case, the influence of the frequencies f1 and f2, with constant amplitude, is completely eliminated.

If the signal components decay in an attenuated manner, the mean value will contain a residual component which reflects the decay of the amplitude. If the attenuation factor is known, the averaging can then take the decay of the amplitudes into account accordingly and thus achieve a complete eradication of the influence of the signal components.

The damping factor can either be calculated from the signal curve itself or it is system-specific and known.

In a fifth embodiment, preprocessing of the weight signal in step b) is performed using a Fourier analysis of the weight signal. Thereby, at least one interference frequency as well as its instantaneous amplitude or amplitudes as well as its phase position(s) are determined, and therefrom an antiphase compensation signal is determined, which is added to the weight signal to obtain a corrected weight signal. Further preferably, an attenuation is continuously determined from the weight signal to correct the amplitudes of the compensation signals.

From the corrected weight signal, the resulting characteristics are determined, with which the at least one artificial neural network operates in step c).

A "liberation" of the weight signal from one or more signal components of interfering frequencies can also be done by a decomposition of the weight signal into individual frequency components by Fourier transformation, deletion of the components corresponding to the interfering frequencies and transformation back into the time domain.

In this way, the weight signal is practically liberated from the dynamic components and thus becomes much calmer. The stability criterion can reach a valid value earlier than with the actual uncorrected weight signal. The time of value acquisition becomes shorter and, in the case of a combination scale, leads to higher performances and to better combination possibilities because of a larger number of weighing devices available for the calculation of a combination.

In a sixth embodiment, the difference between an estimated value SW and the weight signal W is determined, a correction factor over time is determined from this, and this is subtracted from the weight signal W in subsequent measurements to obtain a corrected weight signal, the resulting characteristics being determined from the corrected weight signal and used in step c). From this, an accurate estimated value can be calculated even faster.

Further preferably, any interfering frequencies are determined by a sensor, separately from the actual measurand.

Preferably, for even more accurate calculation of the second constant value, the difference between the estimated value and the weight signal is determined, a correction factor overtime is determined from this, and this is subtracted from the weight signal W in subsequent measurements in order to obtain a corrected weight signal and compensate for a detection error.

This correction is used to determine an even more accurate value after the estimated value has been determined. This ensures that even if a valid signal is determined, an even more accurate weight value can be determined. Thus, in a combination scale, one weighing device can have a valid value—but if that weighing device is not yet needed to determine the combination, the time saved can be used to determine an even more accurate weight signal.

Further preferably, the correction factor can be calculated from a fixed size curve independent of the measuring process—for example from a previous measurement with similar products to be weighed.

In this way, previously determined measured values can be used for subsequent measurements, which can lead to faster and more accurate value recording.

Preferably, different variants of the signal processing methods are calculated in parallel, and their results are merged into an average of the estimated value by a suitable averaging method—thus further improving the accuracy of the estimated value.

Preferably, for the standstill criterion for the weight signal, two successive weight values, output values of the artificial neural network or the digital filter, are compared, and if their difference is smaller than a predetermined value, a counter is incremented, and if their difference is larger than a predetermined value, a counter is decremented incrementally, and when the counter reaches a certain default (i.e., a certain value—for example, 10), the standstill criterion is considered to be satisfied. Then the weight value, output values of the artificial neural network or the digital filter can be used for the further processing, for example, to form a combination.

By specifying a value for the difference between two successive resulting weight values, as well as the value to be specified for the counter at which the stability criterion is considered to be fulfilled, the accuracies of the estimated value for a weight signal can be specified individually—for example, also product-dependent, equipment-specific, etc.

Further preferably, counting up the counter is performed with a predetermined increment and counting down with a predetermined decrement—these can be chosen differently depending on accuracy requirements.

Alternatively, two successive weight values are compared for the stability criterion for the weight signal, and if their difference is less than a predetermined value, a counter is incremented, and if their difference is greater than a predetermined value, the counter is set to the value zero, and when the counter reaches a certain default (i.e., a certain value—for example, 10), the stability criterion is considered as fulfilled.

This makes it even easier to avoid inaccuracies, since in the event of serious deviations between the weight signals of two successive weight values, it is ensured that a certain number of further resulting weight values are recorded and taken into account for the evaluation.

A combination balance according to the invention features:
- a distribution plate and several dosing chutes, each of which is equipped with a drive, and at least one weighing device and, optionally, storage container(s), each of which is/are arranged below the end of a dosing chutes,
- and a collection chute adapted to receive products from the weighing devices,
- wherein the weighing devices are adapted to record and output a weight signal over time,
- wherein the combination scale comprises a control device adapted to perform, for at least one weighing device, a signal processing method according to the invention to determine estimated values for the weight signal of the weighing device(s), to determine combinations therefrom and to control the discharge of product from the weighing device(s).

Thus, there is no need to wait until an accurate weight signal from one or more weighing device(s) is available—the estimated signal that predicts the actual second constant value of the weight signal with sufficient accuracy can be used.

As a result, individual weighing devices can be used earlier to find combinations, the throughput of the combination scale increases, and disturbance variables can be filtered out. Therefore, the error of the weight signals of individual weighing devices also decreases.

BRIEF DESCRIPTION OF THE SEVERAL VIEWS OF THE DRAWINGS

In the following, selected embodiments of the present invention are explained in more detail with reference to the figures described below.

FIG. 2 a) shows that extreme values (i.e. local minima and maxima) are determined, and FIG. 2 b) shows that covered areas are determined up to local minima and maxima, and FIG. 2c) shows the pre-processing of the measurement signal by calculating slopes and curvatures at specified times.

DESCRIPTION OF SPECIFIC EMBODIMENTS OF THE INVENTION

Figure 1:
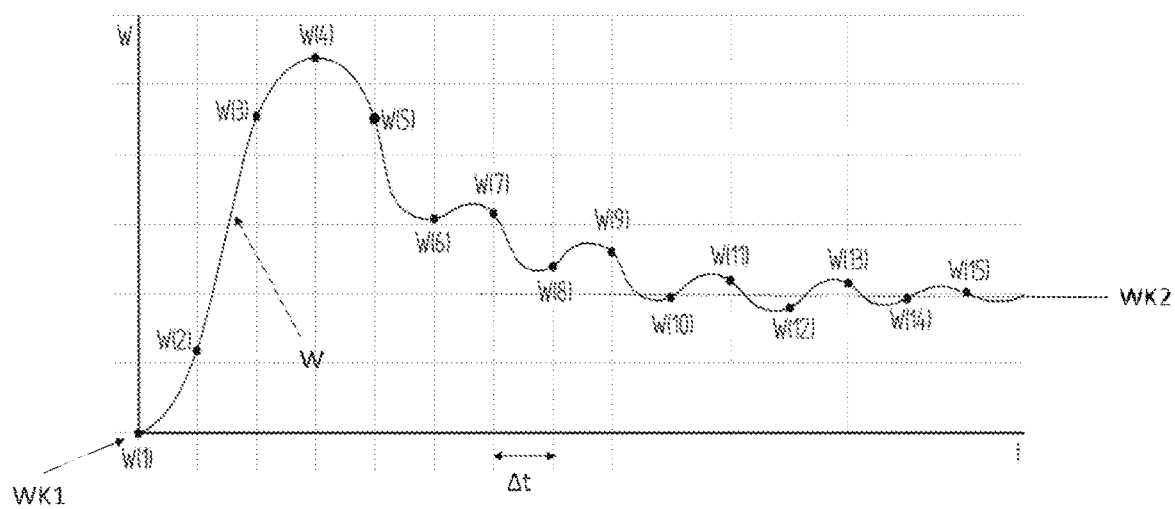
FIG. 1 shows the sampling of a measurement signal (for example the weight signal of a weighing device of a combination scale) plotted against time.

FIG. 1 shows a typical measurement signal over time t—for example, the weight signal W of a weighing cell of a multihead scale. Here, discrete values W(i) are read out at specific times. Time point 0 describes the time at which a product to be weighed is inserted into the weighing cell of the multihead scale. The first constant value WK1 was the zero value, since no weight was displayed in the weighing cell before the product was dropped.

The weight signal W increases steadily and reaches a maximum W(4) (also due to the impact pulse), while it then decreases again over time, the weight signal then being subject to some fluctuations with local minima and maxima. In FIG. 1, fifteen measured values of the weight W(1)-W(15) are shown. The first measurement point W(1) is at 0 as mentioned, then it drastically increases before reaching a first local maximum at W(4), then it continues to decrease until it reaches a next local minimum at W(6), and then maxima alternate with corresponding minima. In the first region, i.e., between W(4) and W(7), the distance between two adjacent extrema, in this case maxima, is relatively large, while it decreases in the further course: For example, the distance between the two maxima near W(13) and W(15) is correspondingly smaller.

The measured value for the weight signal W moves with increasing time t towards a second constant value WK2.

In the example of FIG. 1, the sampling is therefore carried out on the basis of specified time steps Δt. Regardless of how the signal behaves, a new measured value W(i) is always recorded after a certain time span Δt, i.e. the measured signal is sampled accordingly. The corresponding inverse of the time difference Δt is the data rate DR (not shown in FIG. 1) here. The higher the data rate DR (the lower the time difference Δt), the more accurately the weight signal W is reproduced accordingly.

Figure 2:
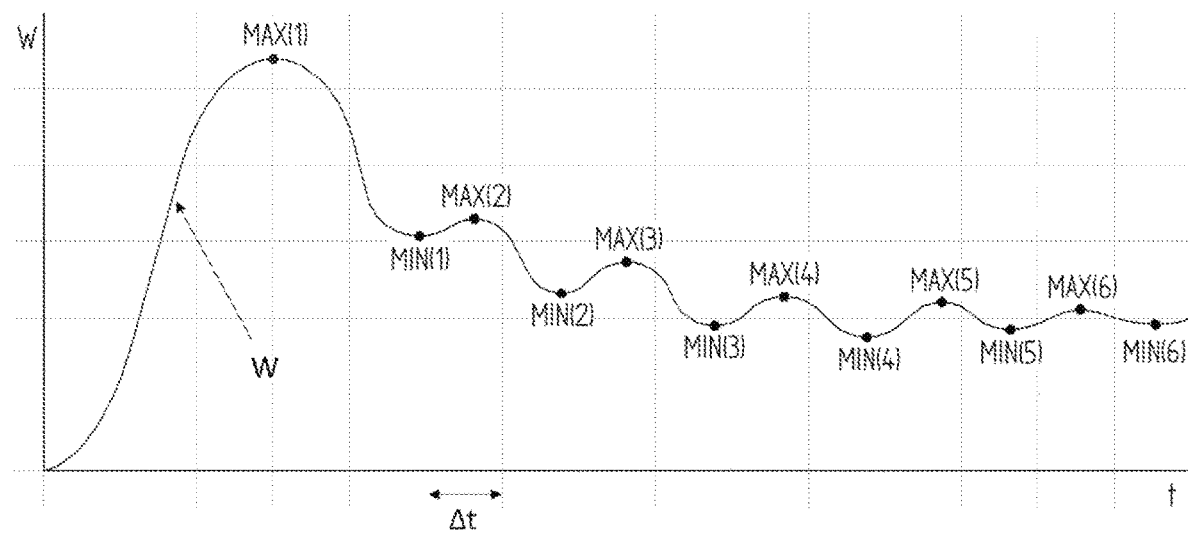
FIGS. 2 a, 2b and 2c show the preprocessing of the measurement signal according to a first embodiment of the present invention.
Figure 2:
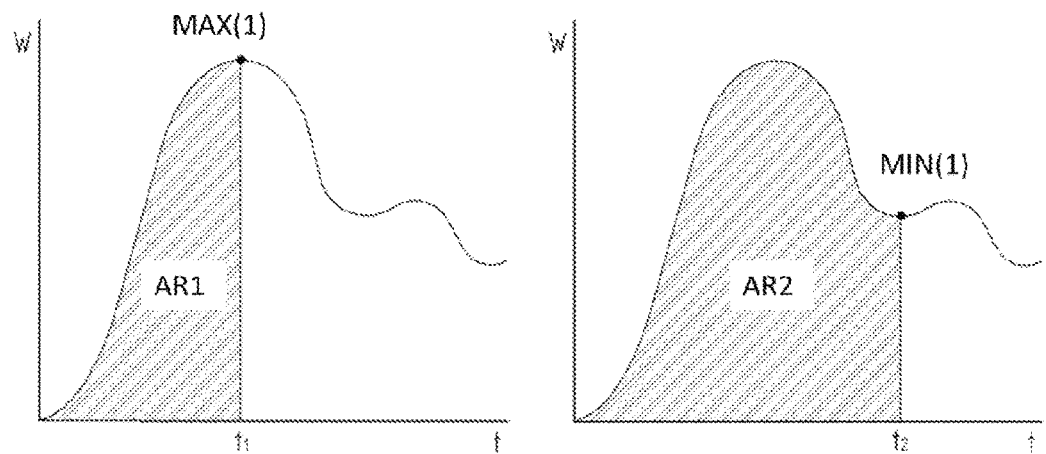
Figure 2:
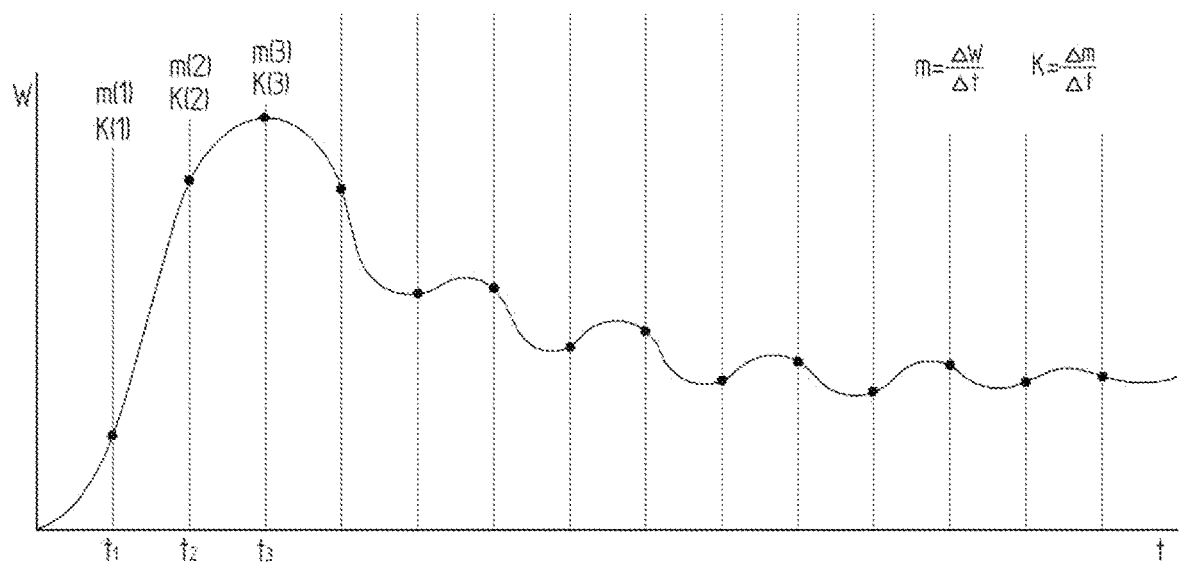

FIG. 2 generally shows a pre-processing of the measured signal values and determination of significant parameters.

FIG. 2 a) shows that the local maxima MAX(1), MAX(2), MAX(3), MAX(4), MAX(5) and MAX(6), i.e. discrete points, are recorded respectively independent of the time span Δt, and correspondingly the local minima MIN(1), MIN(2), MIN(3), MIN(4), MIN(5) and MIN(6). Local maxima and local minima alternate—the distance between two adjacent maxima or minima becomes smaller with time.

FIG. 2 b) shows another example for a preprocessing of the data of the measurement signal. Here, the areas AR1 and AR2 covered by the signal course are recorded at the first local maximum MAX(1) as well as the first local minimum MIN(1) respectively.

FIG. 2 c) shows a third example of preprocessing. Here, at fixed times t1, t2, t3 . . . the slopes m(i) or curvatures K(i) are recorded. Slopes m(i) result from the quotient of the difference of two weight signals W(i+1) and W(i) by the difference of both times $t_{i+1}$ and $t_i$. Curvatures K(i) result from the difference of two slopes m(i+1) and m(i) divided by the difference of both times $t_{i+1}$ and $t_i$.

Preprocessed values, as shown in FIGS. 2 a)-2 c), can better reflect characteristic features of the signal compared to merely sampled discrete values W(i) as depicted in FIG. 1.

Figure 3:
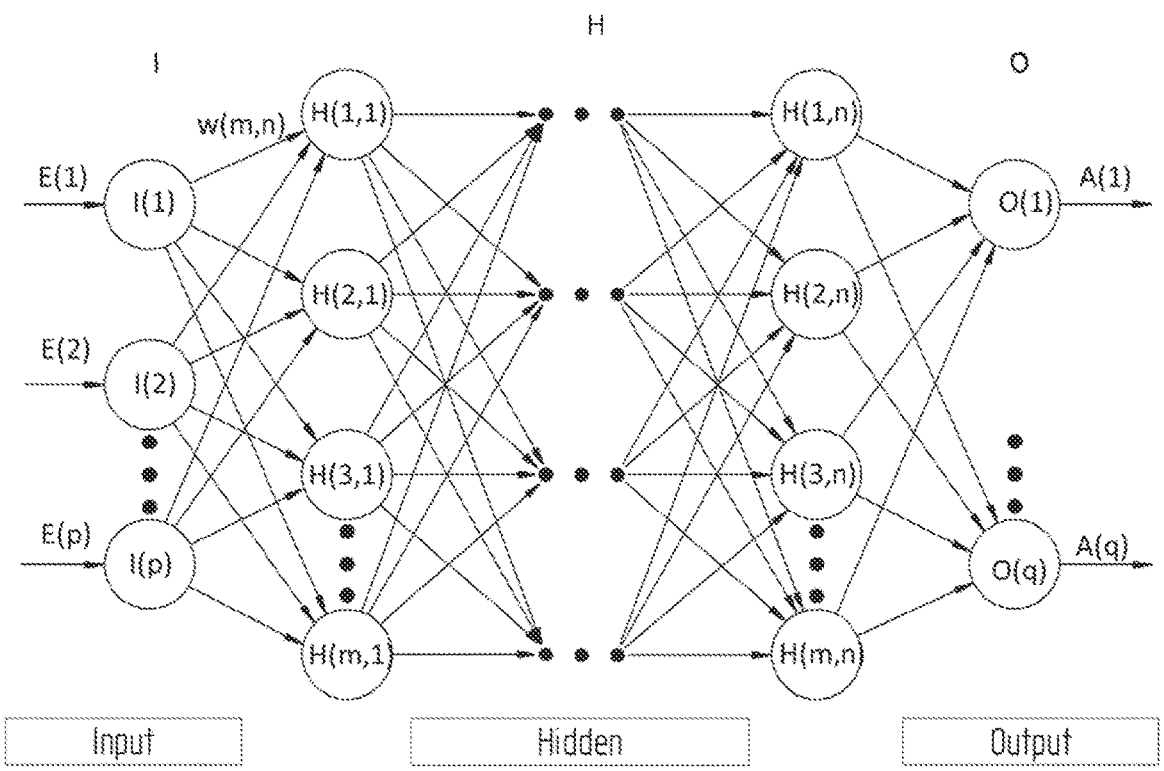
FIG. 3 shows the structure of an artificial neural network according to a first embodiment of the present invention.

FIG. 3 shows the structure and layout of the artificial neural network used for the processing of measured values and signals according to the first embodiment of the present invention. In the example of FIG. 3, an input layer I with multiple nodes I(1), I(2) . . . I(p) is shown. In the input layer I, p input signals are read in, for example the characteristics which are taken from a pre-processing of the measurement signal, for example p maxima/minima of the measurement signal according to FIG. 2a. The hidden layers H consist of a different number of neurons of the hidden layers H(m,n). In the present example, two columns and four rows of neurons of the hidden layer H(m,n) are shown, but dots indicate that this number can be extended accordingly.

Furthermore, multiple neurons of the output layer O with multiple nodes I(1), . . . I(q) are shown.

The output values of the output layer O are A(1) . . . A(q).

These can be, for example, the early estimated value SW of the second constant value WK2 and a prediction accuracy PG, but also other quantities characteristic for the system.

The artificial neural network can therefore consist of a different number of neurons I(p), H(m,n) as well as O(q) in each layer, these are each connected with weighted connections w(m,n) with the corresponding neurons of the same or previous/subsequent layer. Such a weighted connection is exemplarily shown between a neuron of the input layer I(1) as well as a neuron of the hidden layer H(1,1) by an arrow, the weighted connection is named w(m,n) here. The weighted connections w(m,n) are constantly recalculated during the training phase of the artificial neural network and adjusted accordingly.

Figure 4:
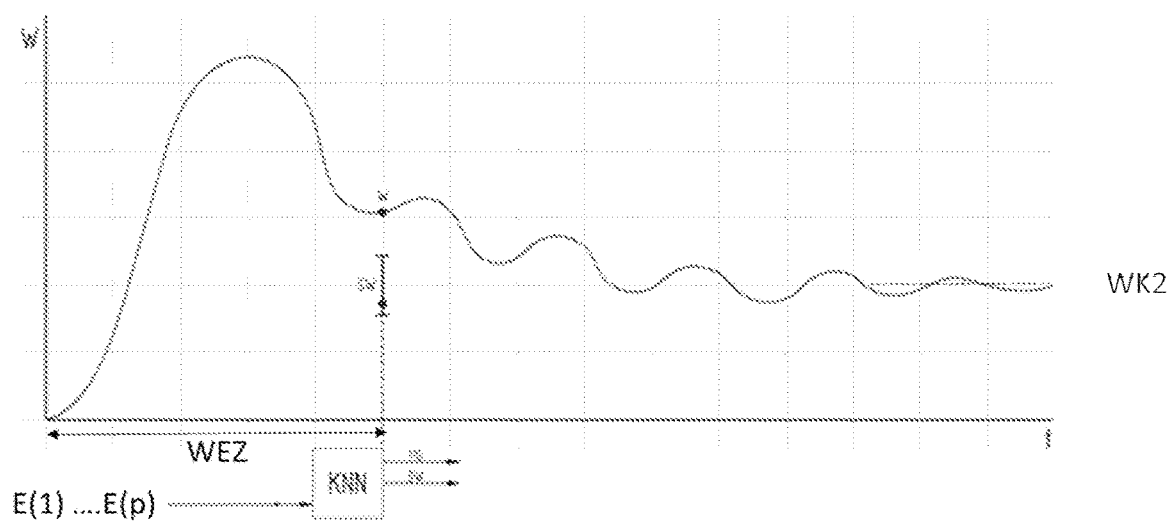
FIG. 4 shows value acquisition using the artificial neural network according to a first embodiment of the present invention.

FIG. 4 shows the value acquisition using a single-stage artificial neural network KNN according to the first embodiment of the present invention. Here it is shown how p values E(1) . . . E(p) are fed to the artificial neural network, and in the present example two values are output, namely the prediction accuracy PG and an estimated value SW for the second constant value WK2. The estimated value SW should indicate a sufficiently accurate stable value. The expected confidence into the accuracy of the estimated value SW is indicated by the prediction accuracy PG.

Figure 5:
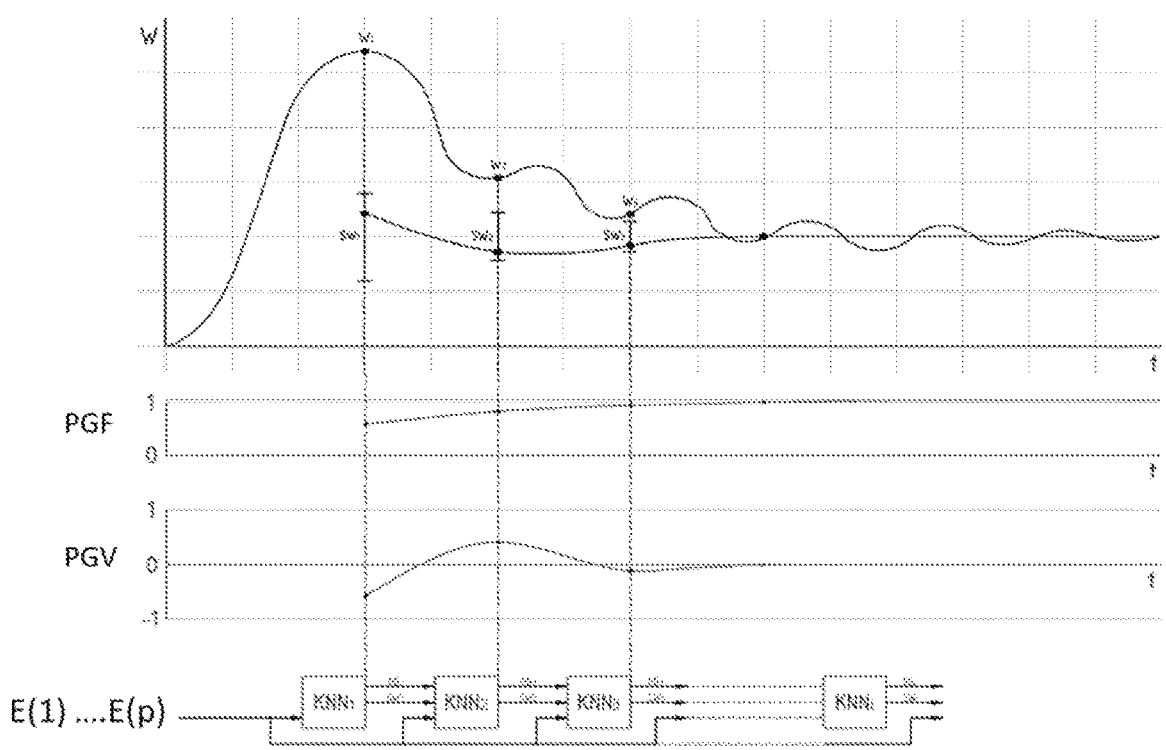
FIG. 5 shows a sequence of multiple artificial neural networks and processing of a measured value according to a second embodiment of the present invention.

FIG. 5 shows a second embodiment of the present invention, here the value acquisition takes place within a multi-stage artificial neural network KNN. Here, several artificial neural networks KNN1, KNN2, KNN3 . . . KNNi are connected in series. As input values i input values E(1) . . . E(p) are again used accordingly. These are read out into the first artificial neural network KNN1. This is now a computation at a first measured value W1, in this case the first local maximum. The first artificial neural network KNN1 provides a first prediction accuracy PG1 as well as a first estimation value SW1 to the second artificial neural network KNN2. Also the input values E1 . . . E(p) are delivered to the second artificial neural network KNN2. At a next measuring point W2 a second calculation is performed. This takes not only the input values E(1) . . . E(p), but also the prediction accuracy PG1 of the first artificial neural network KNN1 as well as its estimated value SW1 into account. The second artificial neural network KNN2 thus outputs a second prediction accuracy PG2 and a second estimated value SW2. These are passed on to the third artificial neural network KNN3, again together with the input values E(1) . . . E(p). The third artificial neural network KNN3 calculates a third prediction accuracy PG3 as well as a third estimated value SW3. The prediction accuracy is continuously getting better, this is also shown by the smaller scatter from SW1 to SW3. The third artificial neural network KNN3 performs the calculation at a third measurement point W3. This is repeated up to an i-th artificial neural network KNNi until finally a final estimate SWi as well as a final prediction accuracy PGi is output. The expected confidence into the accuracy of the estimate PG(i−1) of the previous artificial neural network KNN(i−1) can be better trained using the estimate of SW(i−1) of the previous stage, thus the accuracy of the prediction can be better reflected. Methodologically, the estimation of each estimation value and prediction accuracy is performed as follows: After the first artificial neural network KNN1, both the estimated value SW1 and the prediction accuracy PG1 are in the first estimation range S1∈(S1$m$, S1M) and PG1∈(PG1$m$, PG1M).

After the estimated value SW1 is available, the time for the execution of the next stage of the second artificial neural network for the determination of the next relevant measured value W2 can be determined, whereby the calculation of the second stage of the artificial neural networks can for example take place when the next measured value W2 arrives at the value W=(W(1)+SW(1))/2, or when the area covered by the course of the signal adopts the value A2=k×A1 with k∈(1,n). There can also be other criteria which are independent or even dependent on the course of the signal.

When the current measured value has reached the point W2, the second artificial neural network KNN2 calculates a second estimated value SW2 and a second prediction accuracy PG2. Here, both values are in a respective second estimation range S2∈(S2$_m$, S2$_M$) and PG2∈(PG2$_m$, PG2$_M$). Mostly, the estimation range is now already narrower (S2⊂S1). After the second estimated value SW2 is available, the next relevant measured value W3 can be determined.

After that, any number of further stages can follow according to the same principle. The possible ranges of the estimated values SW should thereby become narrower and narrower, the estimated values SW more and more accurate and the prediction accuracies PG better and better.

A decision to use any estimated value SWi as the expected constant value WK2 can be made using a wide variety of procedures, for example by considering the tendency (is there convergence or divergence of the successive estimated values SWi, SWi−1, or does the scatter band narrow accordingly), or the individual prediction accuracies PGi, PGi−1 . . . can be considered. Also a combination of both procedures can be done.

FIG. 5 shows the unsigned prediction accuracies PGF and the signed prediction accuracies PGV. Both variants improve with time—the unsigned prediction accuracies PGF approach the value of one, and the signed prediction accuracies PGV approach the value of zero.

Figure 6:
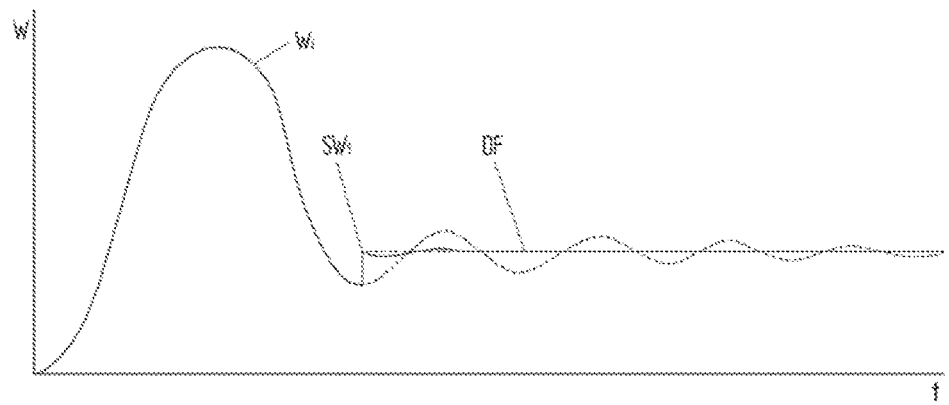
FIGS. 6a and 6b show a third embodiment of the present invention, in which case the switch to a digital filter is made after data processing by an artificial neural network.
Figure 6:
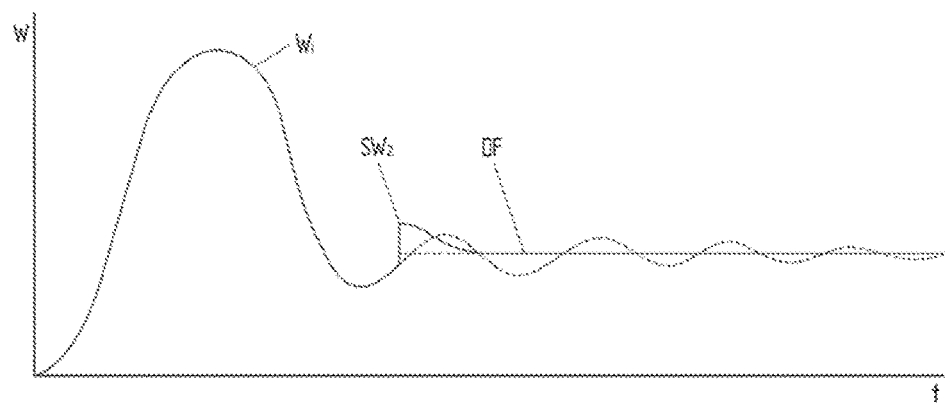

FIG. 6 shows a third embodiment of the present invention, using signal processing by a method according to the first or second embodiment, i.e. filtering with one or more artificial neural networks. These output an estimated value SW for the second constant value WK2. This estimated value is set as the output value for a digital filter DF, which has the weight signal W as input signal and tracks the temporal course of the measurement signal. For this purpose, the internal intermediate parameters of the digital filter DF are calculated in such a way that the output of the digital filter DF corresponds to the value SW, i.e. the estimated value of the calculation of the artificial neural network or even several artificial neural networks. With appropriately set parameters of the digital filter DF (for example, order, corner frequency . . . ), the disturbance variables are filtered out of the measurement signal and the fluctuations of the measurement signal are smoothed. In FIG. 6 $a$), the changeover to a digital filter DF takes place with a very good estimated value SW1, which corresponds to the actual weight value. The fluctuations in the measurement signal (shown dashed) are suppressed by the digital filter DF. Even if the estimated value SW is slightly wrong at the beginning, it is corrected by the digital filter DF with the real input values towards the correct values. A corresponding standstill criterion SSK evaluates the dynamics of the output signal of the digital filter DF according to a given rule. For example, changes in the value may become smaller than a certain amount, and then the use of the filtered signal for the control is allowed—then a weight signal is assumed to be constant and used for the control of the scale.

FIG. 6 $b$) shows a worse estimated value SW2. Herein, it becomes clear that it takes longer for this to approach the second constant value WK2.

Figure 7:
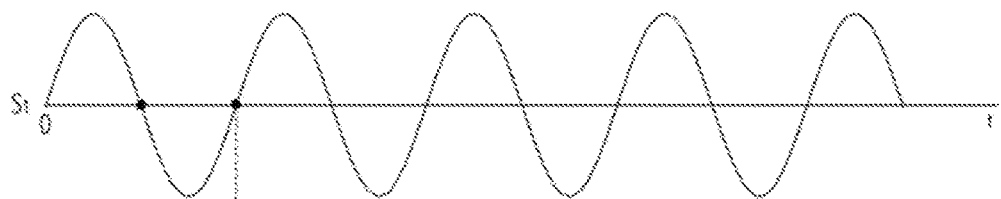
FIGS. 7a, 7b, 7c, 7d and 7e show data processing or measured value processing according to a fourth embodiment of the present invention, here an average value is recorded over entire periods.
Figure 7:
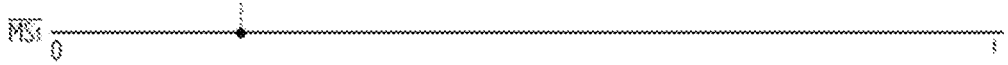
Figure 7:
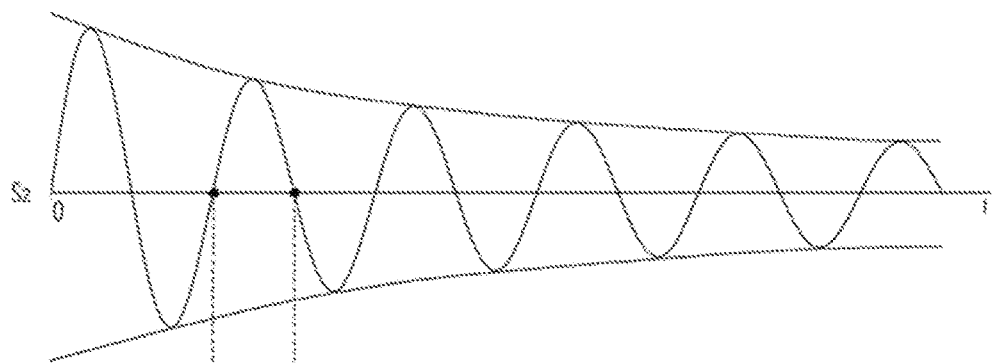
Figure 7:
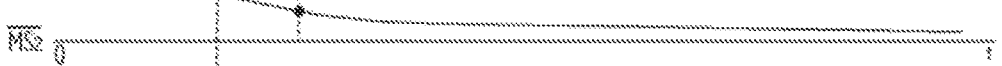
Figure 7:
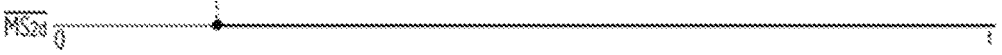

FIG. 7 shows a fourth embodiment of the present invention. The course of the signals S1 and S2 is examined here with respect to the included frequencies, in the present case via Fourier analysis. In FIG. 7 $a$) the periods of the low frequency signal components f1, f2 (not explicitly labeled here) are calculated and an average value is calculated over an entire period of the lowest. Thereby the influence of this frequency f1 with constant amplitude is completely eliminated, i.e. subtracted. If the influence of the first two low frequencies is to be eliminated, it must be averaged over a time corresponding to the smallest common multiple of the first two periods. In this case, the influence of the frequencies f1 and f2, with constant amplitude, is completely eliminated (FIG. 7 $b$)).

If the signal components decay in an attenuated manner (FIG. 7 $c$)), the average value will contain a residual component which reflects the decay of the amplitude (FIG. 7 $d$)).

If the damping factor is known, the averaging can then take the decay of the amplitudes into account accordingly and thus achieve a complete eradication of the influence of the signal components (FIG. 7 $e$)).

The damping factor can either be calculated from the signal curve itself or it is system-specific and known, since every mechanical system has an eigenfrequency.

Figure 8:
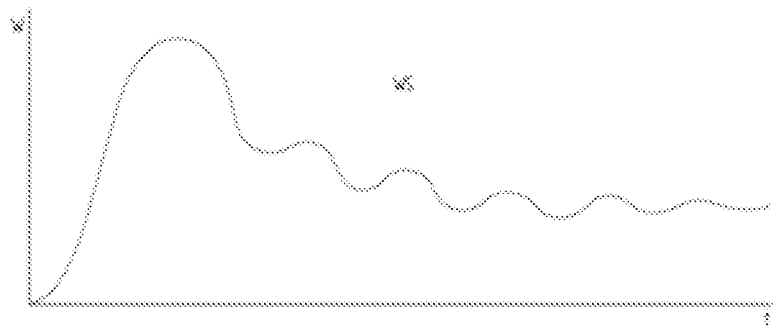
FIGS. 8a, 8b, 8c and 8d show a fifth embodiment of the present invention in which interference frequencies are eliminated by a compensation signal in phase opposition.
Figure 8:
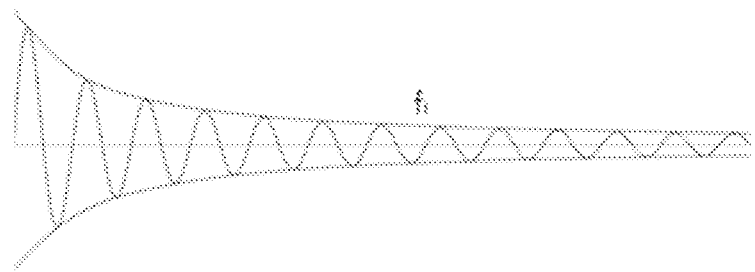
Figure 8:
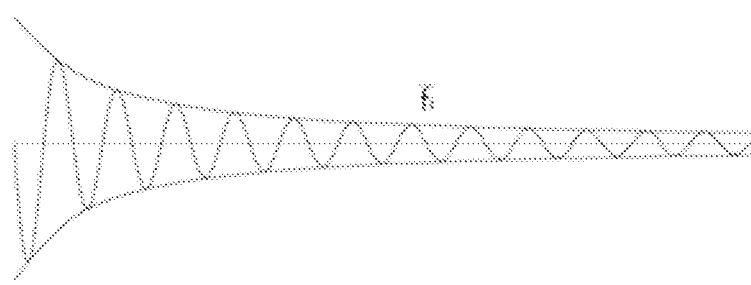
Figure 8:
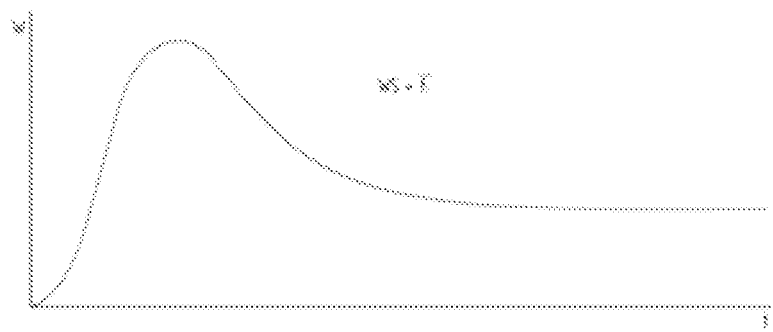

FIG. 8 shows a fifth embodiment of the present invention. Here, FIG. 8 $a$) shows a weight signal WS affected by disturbance variables.

Corresponding interference frequencies are to be filtered out. Here, the course of the signal is first examined for the frequencies it contains, for example with the aid of a Fourier analysis. From this, the interference frequency f1, as well as its instantaneous amplitudes and the phase positions can then be determined (FIG. 8 $b$)). After a certain number of measurements, i.e. a measurement over several oscillations, the course of these measured variables can be used to calculate an damping of the respective frequency. Then, in parallel with the further acquisition of the weight signal, an counter-phase compensation signal f can be determined (FIG. 8 $c$)). From this, a post-processed weight signal W can be calculated, in which the counter-phase compensation signal f is added to the weight signal WS (FIG. 8 $d$)). The disturbance variable can thus be eliminated. An adjusted weight signal W is then obtained from this. The calculated damping can be continuously recalculated from the measurement signals in order to correct amplitudes of the compensation signals. The measurement signal is therefore liberated from one or more interfering frequencies, the weight signal W is therefore almost completely liberated from the dynamic components of the interfering frequencies and is therefore much quieter. This weight signal W is then used as input value for the calculation of the estimated value with at least one artificial neural network according to one of the previous embodiments. A standstill criterion can detect a valid and correct value earlier than with the actual weight signal, and the time of the weighing process becomes shorter. In a multihead scale, this may result in higher performance or better combination capabilities due to a greater number of weighing devices available for combination.

Figure 9:
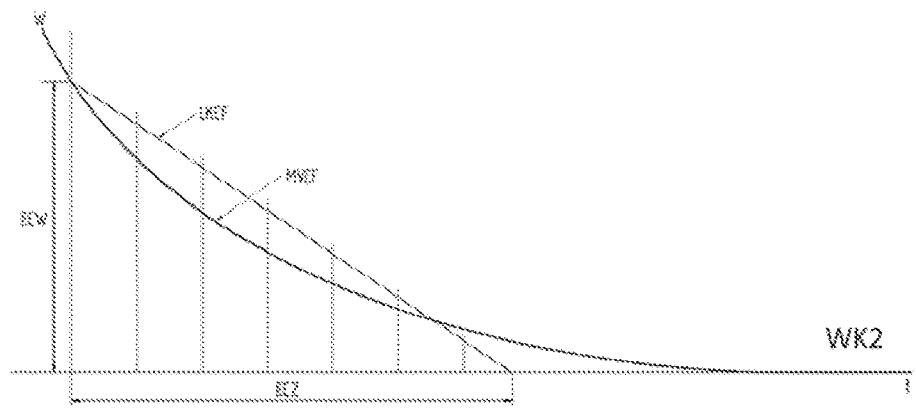
FIGS. 9a, 9b and 9c show a sixth embodiment of the present invention, it is shown how a corresponding detection error is corrected here.
Figure 9:
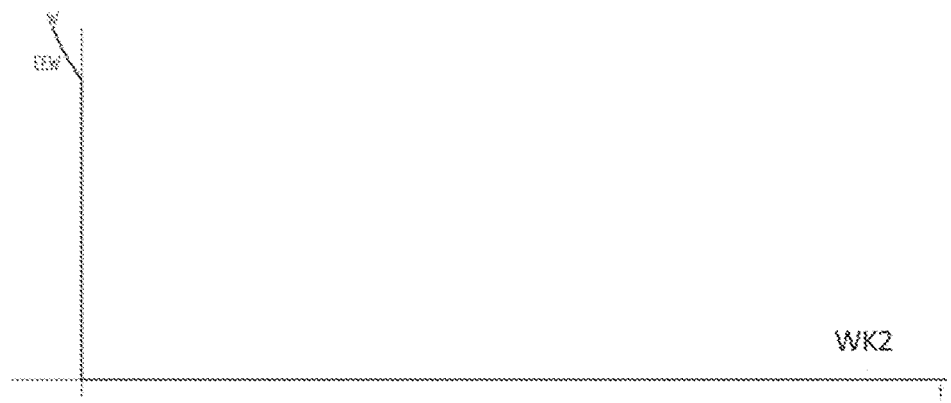
Figure 9:
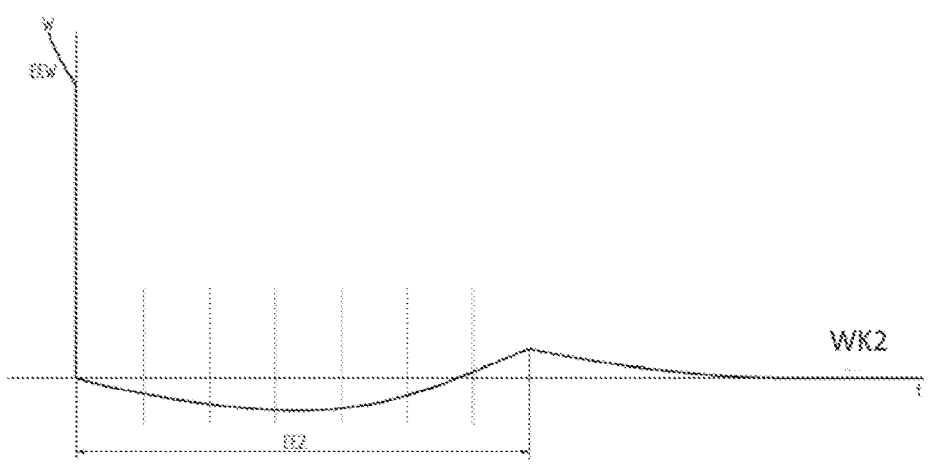

FIG. 9 shows a sixth embodiment according to the present invention; here, a measurement process is carried out according to one of the previous embodiments.

However, an adaptive correction of the filtered measurement signal can be performed here to compensate for a detection error accordingly. Also in this case, a standstill criterion SSK determines the time at which the weight signal W can be considered valid.

FIG. 9 a) shows that a first value that is considered valid, i.e. first detection value EEW, is not yet equal to the second constant value WK2 and the course of the weight signal W over time will still change until it reaches the second constant value WK2. The first detection value EEW as well as the course of the weight signal W over time are stored in this embodiment. Over several measurements, an average course of the detection error MVEF is formed until a static final value is reached. For each upcoming measurement, a value corresponding to the time course is then subtracted from the presence of the first detection value EEW and thus this is corrected accordingly. This is shown in FIG. 9 b)—here the detection error MVEF is subtracted from the weight signal from the detection value EEW.

The uncorrected course of the weight signal W is in turn included in the ongoing calculation of the detection error MVEF. Due to the continuous new calculation of the detection error MVEF, it adapts to the current behavior of the measuring arrangement and also according to the measuring conditions. Environmental influences can also be considered here, such as temperature, humidity, solar radiation or similar. The correction and the behavior of the signal processing are therefore adaptive. A correction formula can be calculated from the course of the detection error MVEF, and this can be used for the correction (for example, a linearly decreasing correction LKEF, starting with the detection value EEW over a time span of EEZ, as shown in FIG. 9 c). Even with a simple, linear correction, the corrected course of the values is significantly more accurate than the uncorrected one, especially in the first time span after initial acquisition.

Figure 10:
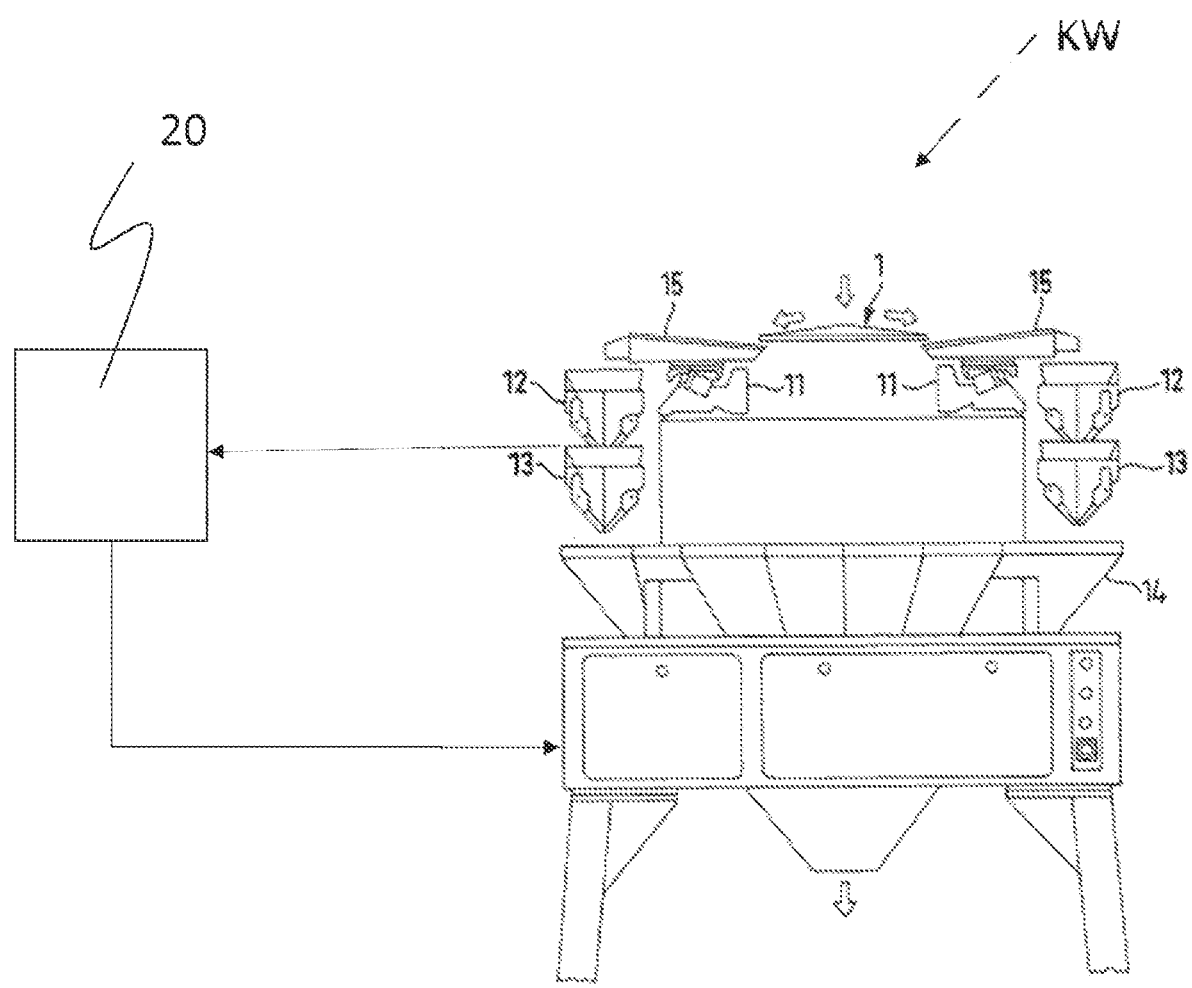
FIG. 10 shows a section of a multihead scale with a connected signal processing system according to one of the embodiments of the present invention.

FIG. 10 shows a combination scale KW on which a process according to the invention can be carried out. The combination scale consists of a distribution plate 1 on which products are discharged. This distributes it to dosing chutes 15, each of which is provided with a drive 11. The product falls from the dosing chutes into various storage containers 12 and then into the weighing device 13.

The individual weighing devices 13 can weigh the products contained therein and form a combination thereof—for example, if 100 g of product is to be packaged, certain weighing devices open so that a product weight as close to 100 g as possible can then be discharged.

When these weighing devices 13 open, the products are discharged into a collecting chute 14, from where they can then be fed to a packaging unit (not shown here). Signal processing is shown on one weighing device 13 by way of example. Here, a weighing signal goes to a control device 20, which accordingly performs a signal processing procedure according to the present invention. This generates an estimated value SW for the weight signal of the individual weighing devices 13. These estimated values SW are used by the control device 20 for combination finding, and the opening of the individual weighing devices 13 is controlled as soon as a combination could be found.

The invention is not limited to the described embodiments. Other input and output values may be used for the artificial neural network(s). Also, other ways of determining the pre-processing of the weight signal may be used.

It should also be noted that any of the embodiments of the present invention may be combined in any manner.

The present invention relates to a signal processing method for weight signals W of scales, in particular combination scales K.

Signal processing is performed using preprocessed discrete values W(i) of the weight signal W, which are supplied to at least one artificial neural network. With the help of this at least one artificial neural network, an estimated value SW for the actual weight is determined, for example in a weighing device of a combination scale. This is performed faster than if waiting for the actual weight signal. The estimated values SW are forwarded to the combination scale KW, which uses them to form combinations.

What is claimed is:

1. A signal processing method for processing a weight signal of a weighing device, comprising the following steps:
    a) Repeatedly sampling a weight signal (W) between a first constant value (WK1) and a second constant value (WK2) with a sampling interval ($\Delta t$), wherein i discrete values (W(i)) are obtained;
    b) Preprocessing of the weight signal (W), determination and output of resulting characteristics (RK(i)),
    c) Providing at least two, at most i resulting characteristics (RK(i)) to respective inputs (E(p)) of at least one artificial neural network (KNN(1)) as input values, processing the input values (RK(i)) in at least one inner layer (H(m,n)),
    d) Outputting of output values (A(q)) from an output layer (O(q)), wherein an output value (A(1)) is an estimated value (SW) for the second constant value (WK2),
    wherein input layers (I(i)), the at least one inner layer (H(i)) and output layers (O(i)) each comprise neurons which are connected via weighted connections (w(m, n)) to the neurons of the same or respective preceding and/or succeeding layers;
    d1) checking whether the prediction accuracy (PG) is within a predetermined value range and a predetermined standstill criterion (SSK) has been reached; and
    d2) when the prediction accuracy (PG) is within a predetermined value range, accepting the estimated value (SW) and when the prediction accuracy is not within the predetermined value range, processing further weight values until a valid value is reached, or adjusting the stability criterion (SSK) and repeat steps a) to d1);
    wherein i artificial neural networks (KNN(i)) are used in series, where i is greater than 1,
    comprising the following further steps:
    e) Reading in the input values (RK(i)) as well as output values (A(i−1, q)) of the respective previous artificial neural network (KNN (i−1)) into a further artificial neural network (KNN(i)), wherein one output value (A(i−1, 1)) is the estimated value (SW) for the second constant value (WK2), and a further output value (A(i−1,2)) is the prediction accuracy (PG) of the respective previous artificial neural network (KNN (i−1));

f) Calculating output values (A(i,q)) of the current artificial neural network (KNN (i)), wherein one output value (A(i,1)) is the estimated value (SW1) for the second constant value (WK2), and another output value (A(i,2)) is the prediction accuracy (PG1) of the current artificial neural network (KNN (i));

g) (i−1)-fold repetition of steps e) and f),

Outputting of the final output values A(q, i), where at least a final estimated value (SW(i)) and a final prediction accuracy (PG(i)) are output.

2. The signal processing method according to claim 1, wherein the resulting characteristic quantities in step b) are selected from a group consisting of
maxima (Max(i)) point in time (t(i)),
minima (Min(i)) point in time (t(i)),
points in time (t(i)) associated with Max(i) and Min(i),
areas AR(i) covered by a signal course at specific points in time (t(i)),
slopes m(i) at certain points in time (t(i)),
curvatures K(i) at certain points in time (t(i)),
temperature,
pressure,
humidity,
time,
solar radiation,
EMC characteristics, and
characteristics of product properties.

3. The signal processing method according to claim 1, wherein in step d) a prediction accuracy (PG) is further output as a further output value (A(2)).

4. The signal processing method according to claim 1, wherein the decision to use the estimated value (SW) as the second constant value (WK2) is made in dependence on the tendency, for example convergence, divergence or scatter band of the successive estimated values SW(i) or in dependence on the prediction accuracies PG(i) or a combination of both.

5. The signal processing method according to claim 1, wherein the estimated value (SW) of the at least one artificial neural network (KNN(i)) is supplied to a digital filter (DF), which has the current weight signal (W) as input signal and, starting from this value, tracks the temporal course of the weight signal (W) from this moment onwards.

6. The signal processing method according to claim 5, wherein the interference frequencies are determined by a further sensor (SE), separately from the actual measured quantity.

7. The signal processing method according to claim 1, wherein a preprocessing of the weight signal (W) is carried out in step b) by a Fourier analysis of the weight signal (W), wherein at least one interference frequency (SF) as well as its instantaneous amplitudes (AS) as well as its phase positions (PF) are determined, and a counter-phase compensation signal (SK) is determined therefrom, which is added to the weight signal (W) in order to obtain a corrected weight signal (WKORR), wherein preferably a damping (D) is continuously determined from the weight signal (W) in order to correct the amplitudes (AK) of the compensation signal (SK),
wherein the resulting characteristics RK(i) are determined from the corrected weight signal (WKORR).

8. The signal processing method according to claim 1, wherein the difference of an estimated value (SW) and the weight signal (W) is determined, a correction factor (KORR) over time is determined therefrom, and this is subtracted from the weight signal (W) in subsequent measurements to obtain a corrected weight signal (WKORR).

9. The signal processing method according to claim 8, wherein the correction factor (KORR) is calculated from a fixed magnitude curve of weight signals independent of the measurement process.

10. The signal processing method according to claim 1, wherein different variants of the signal processing methods are calculated in parallel and their results are merged into an average value of the estimated value (SW) for the second constant value (WK2) by a suitable averaging method.

11. The signal processing method according to claim 1, wherein two successive weight values (W(i), W(i−1)) are compared for the standstill criterion (SSK) for the weight signal (W), and if their difference is smaller than a predetermined value (DIFF), a counter (Z) is incremented, and if their difference is greater than a predetermined value (DIFF), a counter (Z) is incrementally decreased, and if the counter (Z) reaches a specific preset requirement (ZV), the standstill criterion (SSK) is considered to be fulfilled, the counting up of the counter (Z) preferably taking place with a predetermined increment (IN) and the counting down taking place with a predetermined decrement (DE).

12. The signal processing method according to claim 1, wherein two successive weight values (W(i−1), W(i)) are compared for the standstill criterion (SSK) for the weight signal (W), and if their difference is smaller than a predetermined value (DIFF), a counter (Z) is incremented, and if their difference is greater than a predetermined value (DIFF), the counter (Z) is set to zero, and if the counter (Z) reaches a certain preset (ZV), the standstill criterion (SSK) is considered to be fulfilled.

13. A combination scale (KW), comprising:
a distribution plate (1) and several dosing chutes (15), each of which is provided with a drive (11),
as well as at least one weighing device (13) and optionally storage container(s) (12), each of which is/are arranged below the end of a dosing chutes (15),
and a collection chute (14) adapted to receive products from the weighing devices (13),
wherein the weighing means (13) are adapted to record a weight signal (W) over time (t),
wherein the combination scale (KW) further comprises a control device (20) adapted to perform, for at least one weighing device (13), a signal processing method according to claim 1 for determining estimated values (SW) for the weight signal (W) of the weighing device(s) (13), determining combinations therefrom and controlling the discharge of product from the weighing device(s) (13).

* * * * *